US008413988B2

(12) United States Patent
Gearty

(10) Patent No.: US 8,413,988 B2
(45) Date of Patent: *Apr. 9, 2013

(54) COLOR BY SYMBOL PICTURE PUZZLE KIT

(76) Inventor: Anita Jane Gearty, Tinton Falls, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/355,569

(22) Filed: Jan. 23, 2012

(65) Prior Publication Data

US 2012/0119439 A1 May 17, 2012

Related U.S. Application Data

(63) Continuation of application No. 12/535,670, filed on Aug. 4, 2009, now Pat. No. 8,191,895, which is a continuation-in-part of application No. 12/188,208, filed on Aug. 8, 2008, now abandoned.

(51) Int. Cl.
*A63F 9/10* (2006.01)

(52) U.S. Cl.
USPC ........................................ 273/157 R; 434/84

(58) Field of Classification Search .............. 273/157 R, 273/156; 434/84, 406
See application file for complete search history.

(56) References Cited

U.S. PATENT DOCUMENTS

| | | | | | |
|---|---|---|---|---|---|
| 1,480,458 | A | * | 1/1924 | Mershon | 434/84 |
| 2,450,127 | A | * | 9/1948 | Gardener et al. | 434/84 |
| 2,825,150 | A | * | 3/1958 | Steiner | 434/84 |
| 2,876,575 | A | * | 3/1959 | Leika | 156/248 |
| 2,923,550 | A | * | 2/1960 | Blackman et al. | 273/157 R |
| 2,954,615 | A | * | 10/1960 | Brown | 434/84 |
| 3,364,598 | A | * | 1/1968 | Cook | 434/88 |
| 3,433,485 | A | * | 3/1969 | Renn et al. | 273/157 R |
| 3,707,287 | A | * | 12/1972 | Spector | 273/157 R |
| 4,023,807 | A | * | 5/1977 | Santianni | 273/238 |
| 4,416,632 | A | * | 11/1983 | Berman | 434/84 |
| 4,612,220 | A | * | 9/1986 | Baxter | 428/33 |
| 4,799,680 | A | * | 1/1989 | Weimar | 273/157 R |
| 4,828,497 | A | * | 5/1989 | Kurgan | 434/96 |
| 4,893,817 | A | * | 1/1990 | Shilo | 273/157 R |
| 5,090,701 | A | * | 2/1992 | Chang | 273/157 R |
| 5,217,378 | A | * | 6/1993 | Donovan | 434/116 |
| 6,213,465 | B1 | * | 4/2001 | Jacoby | 273/157 R |
| 7,484,732 | B2 | * | 2/2009 | Adams | 273/157 R |
| 7,584,565 | B2 | * | 9/2009 | Zebersky | 40/716 |
| 8,191,895 | B2 | * | 6/2012 | Gearty | 273/157 R |
| 2006/0170156 | A1 | * | 8/2006 | Fabrige | 273/157 R |
| 2008/0203659 | A1 | * | 8/2008 | Cabrera | 273/153 R |
| 2009/0015001 | A1 | * | 1/2009 | Haldorsen | 283/102 |
| 2011/0148040 | A1 | * | 6/2011 | Bianco | 273/157 R |

* cited by examiner

*Primary Examiner* — Steven Wong
(74) *Attorney, Agent, or Firm* — Ash Tankha; Lipton, Weinberger & Husick

(57) ABSTRACT

A picture puzzle kit is provided for coloring a picture puzzle marked with indicia corresponding to multiple colors. The picture puzzle kit comprises puzzle pieces, color charts, and coloring tools. The puzzle pieces comprise parts of a picture and are marked with indicia corresponding to different colors. The color charts display colors corresponding to the indicia marked on the puzzle pieces. In an embodiment, multiple removable layers are stacked one above the other on each of the puzzle pieces. In another embodiment, an embedded audio assembly is provided in each of the puzzle pieces and the color charts for audibly indicating characteristics of the puzzle pieces and the color charts respectively. The puzzle pieces are linked to assemble the picture puzzle. The coloring tools enable the user to color the puzzle pieces using the colors displayed on the color charts corresponding to the indicia marked on the puzzle pieces.

16 Claims, 13 Drawing Sheets

COLOR BY SYMBOL PICTURE PUZZLE KIT

CROSS REFERENCE TO RELATED APPLICATIONS

This is a continuation application of non-provisional patent application Ser. No. 12/535,670, titled "Color by Symbol Picture Puzzle Kit" filed on Aug. 4, 2009 in the United States Patent and Trademark Office, now U.S. Pat. No. 8,191,895, issued on Jun. 5, 2012, which is continuation in part application of non-provisional patent application Ser. No. 12/188,208, titled "Color By Symbol Picture Puzzle Kit" filed on Aug. 8, 2008 now abandoned in the United States Patent and Trademark Office

BACKGROUND

This invention, in general, relates to puzzles. More particularly, this invention relates to coloring a picture puzzle using indicia representing different colors marked on the picture puzzle.

A puzzle is a game that requires ingenuity and persistence in assembling or solving. Puzzles are often devised as a form of entertainment. Puzzles may be divided into different categories, for example, jigsaw puzzles, picture puzzles, transport puzzles, word puzzles, sliding puzzles, logic puzzles, folding puzzles, etc. Typically, puzzles only provide a user a means of assembling puzzle pieces together. There is a need for puzzles that allow a user to color a puzzle piece by associating an indicia of the color marked on the puzzle piece with the color shown in a color chart.

Hence, there is a need for a picture puzzle kit that is educational in nature and entertains a user by allowing the user to color a picture puzzle using indicia representing different colors marked on the puzzle pieces.

BRIEF DESCRIPTION OF THE DRAWINGS

The following detailed description of the invention is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
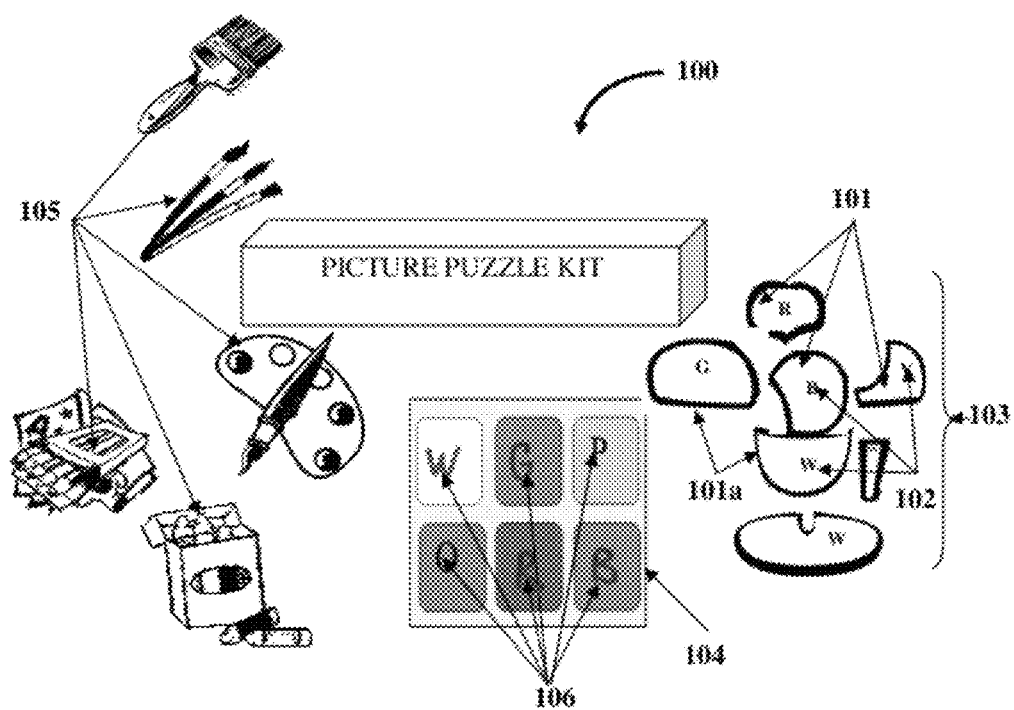
FIG. 1 illustrates a picture puzzle kit that enables a user to color a picture puzzle marked with indicia corresponding to multiple colors.

FIG. 1 illustrates a picture puzzle kit 100 that enables a user to color a picture puzzle 103 marked with indicia 102, for example W, G, B, R, etc. corresponding to multiple colors. The picture puzzle kit 100 disclosed herein comprises multiple puzzle pieces 101, a color chart 104, and coloring tools 105. Each of the puzzle pieces 101 has a length, a width, and a thickness. The thickness is small compared to the length and the width. Each of the puzzle pieces 101 defines an outside edge 101a. The outside edge 101a of each of the puzzle pieces 101 is configured to mate with an outside edge 101a of at least one or two other puzzle pieces 101.

Figure 2A:
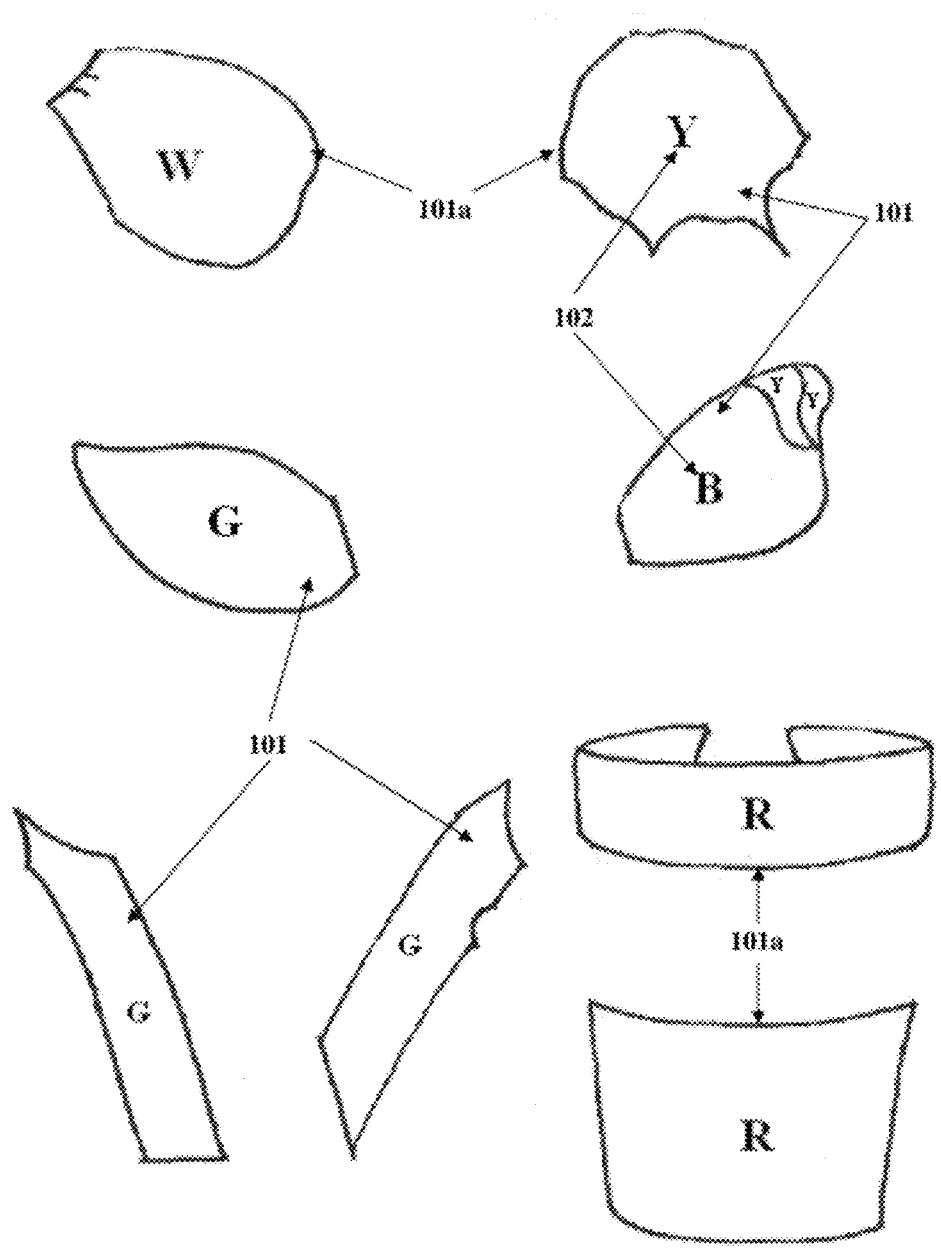
FIG. 2A exemplarily illustrates puzzle pieces comprising parts of a picture of a flower pot.

The puzzle pieces 101 comprise parts of a picture. FIG. 2A exemplarily illustrates puzzle pieces 101 comprising parts of a picture of a flower pot. The puzzle pieces 101 are marked with and display indicia 102 or symbols that correspond to different colors. The indicia 102 displayed on the puzzle pieces 101 are marked by, for example, stamping, engraving, imprinting, impressing, etc. The indicia 102 are, for example, in the form of alphabets corresponding to different colors. For example, in FIG. 2A, the puzzle pieces 101 are marked with the indicia 102 W, G, Y, R, and B corresponding to the colors white, green, yellow, red, and blue respectively. The puzzle pieces 101 are made of, for example, plastic, card board, or a wooden material. The wooden material is, for example, a wood composite, a pressed wood, a solid wood, etc. The picture puzzle kit 100 may further comprise a base for supporting the puzzle pieces 101.

Figure 2B:
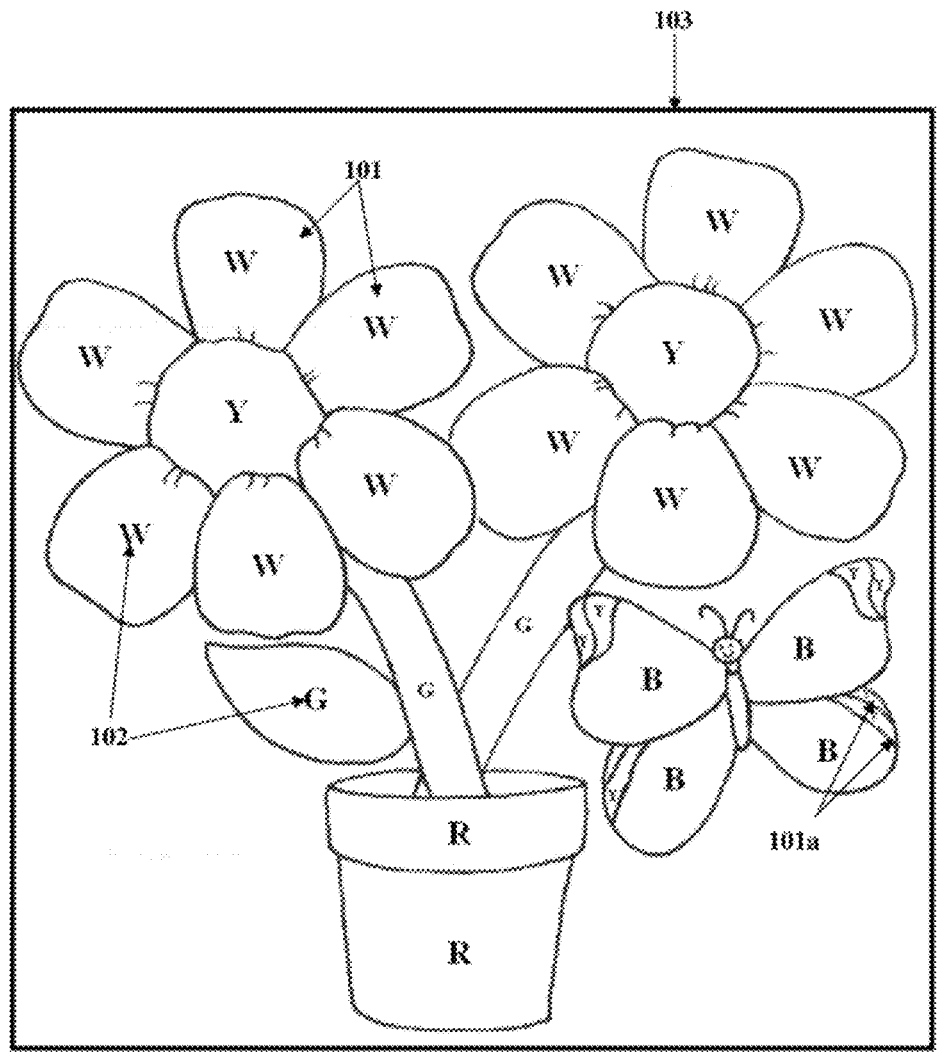
FIG. 2B exemplarily illustrates puzzle pieces marked with indicia representing different colors, placed adjacent to one another to assemble the flower pot picture puzzle.

The picture puzzle 103 is assembled by linking the puzzle pieces 101. The picture puzzle 103 is of different designs. The puzzle pieces 101 are linked by placing the puzzle pieces 101 adjacent to one another or by interlocking the adjacent puzzle pieces 101. FIG. 2B exemplarily illustrates puzzle pieces 101 marked with indicia 102 representing different colors, placed adjacent to one another to assemble the flower pot picture puzzle 103. In an embodiment, the puzzle pieces 101 are also shaped as jigsaw puzzle pieces 601 as exemplarily illustrated in FIG. 6A, for linking the puzzle pieces 101 by interlocking. The puzzle pieces 101 together define the picture when the outside edge 101a of each of the puzzle pieces 101 are mated one to another and each one of the puzzle pieces 101 is colored with colors corresponding to the colors on the color chart 104 corresponding to the indicia 102 marked on the puzzle pieces 101 using the coloring tools 105.

In an embodiment, multiple removable layers are stacked one above the other on each of the puzzle pieces 101. The removable layers are, for example, peel-off self adhesive sheets of flexible plastic or scratch-off layers. Each of the removable layers is removed to reveal another one of the removable layers below the removed layer. The removable layers are marked with different indicia 102, therefore each one of the revealed removable layers presents a different coloring possibility on the puzzle pieces 101. In an embodiment, each of the removable layers is transparent and is marked with one of the indicia 102 corresponding to one of the different colors. When transparent layers are used, the removable layers below the removed upper layers are partially visible due to the transparence. Coloring tools 105 of translucent colors are provided for coloring on the transparent removable layers. A user may color on one layer, or may remove the first layer and then color on the next layer. Also, when the colored layers are placed one above the other on the puzzle pieces 101, the colored layers in combination form new colors. In another embodiment, the layers affixed to the puzzle pieces 101 are not transparent.

Consider an example where a transparent removable top layer and a transparent removable bottom layer are stacked one above the other on the upper surface of the puzzle piece 101. The top layer is marked with an indicia, for example, B. The bottom layer is marked with an indicia, for example, Y. The user first colors the top layer blue in accordance with the color chart 104 for the indicia B on the puzzle piece 101 using one of the coloring tools 105 provided in the picture puzzle kit 100. The user then removes the top layer to expose the bottom layer. On seeing the indicia Y marked on the bottom layer, the user determines that Y represents the color yellow using the color chart 104. The user then colors the bottom layer yellow using the coloring tools 105 provided in the picture puzzle kit 100. The user can then reattach the blue colored top layer over the yellow colored bottom layer on the puzzle piece 101 to yield a green color for the puzzle piece 101.

Figure 7:
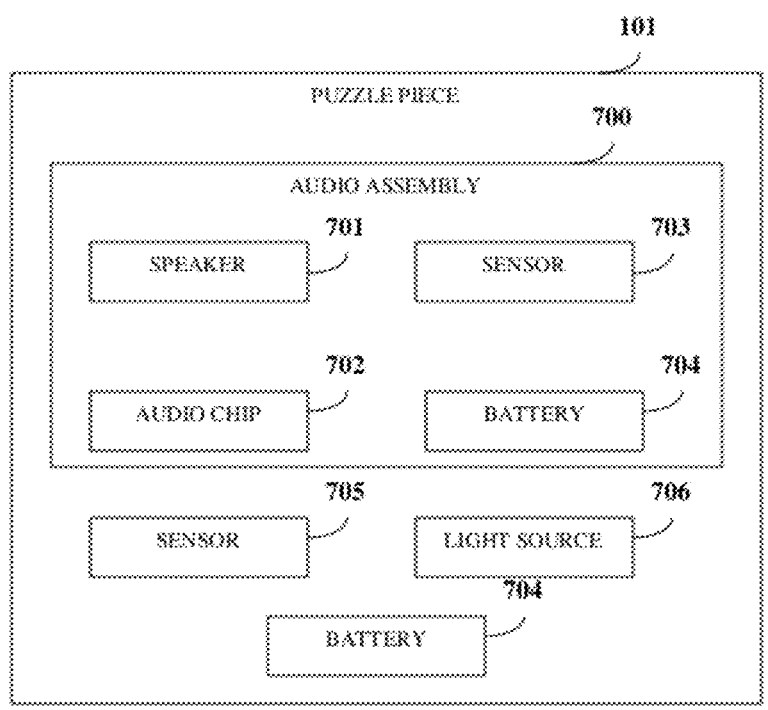
FIG. 7 exemplarily illustrates a block diagram of a puzzle piece embedded with an audio assembly for audibly indicating one or more characteristics of the puzzle piece.

A battery 704 operated light source 706, for example, a light emitting diode (LED), as exemplarily illustrated in FIG. 7 may be embedded in the puzzle piece 101 to illuminate the colored removable layers stacked on the puzzle piece 101. The yellow colored bottom layer and the blue colored top layer on the puzzle piece 101 in combination will therefore appear as an illuminated green colored puzzle piece.

In another embodiment, a rub off removable layer is provided on each of the puzzle pieces 101. The rubbed off removable layer reveals one of the indicia 102 corresponding to one of the colors for the puzzle piece 101.

In another embodiment, each of the puzzle pieces 101 comprises an embedded audio assembly 700 for audibly indicating a single or a combination of characteristics, for example, color, name, etc. of each of the puzzle pieces 101 when pressure is applied on the puzzle pieces 101. FIG. 7 exemplarily illustrates a block diagram of a puzzle piece 101 embedded with an audio assembly 700 for audibly indicating one or more characteristics of the puzzle piece 101. The embedded audio assembly 700 comprises a battery 704, an audio chip 702, and a speaker 701. The embedded audio assembly 700 further comprises a sensor 703 for sensing the applied pressure. As an example, when a user presses a puzzle piece 101 marked the indicia 102 G with a finger, the speaker 701 audibly announces the word "green". In another example, when the user presses a puzzle piece 101 shaped like a leaf, the speaker 701 announces the word "leaf". A combination of characteristics, for example, name along with the color, of each of the puzzle pieces 101 may also be announced when pressure is applied on each of the puzzle pieces 101. For example, when the user presses a puzzle piece 101 shaped like a leaf marked with an indicia 102 G, the speaker 701 announces a message "green leaf". The user can then color the puzzle piece 101 with a green color using the coloring tools 105 provided in the picture puzzle kit 100.

In an embodiment, the embedded audio assembly 700 audibly indicates the characteristics of each of the puzzle pieces 101 when each of the puzzle pieces 101 is pressed one or more times. The audio chip 702 in the embedded audio assembly 700 is programmed to count the number of times pressure is applied on each of the puzzle pieces 101 and sends an appropriate message signal to the speaker 701. For example, the embedded audio assembly 700 audibly indicates the color of a puzzle piece 101 when pressed one time and the name of puzzle piece 101 when pressed a second time. The user can then color the puzzle piece 101 with the corresponding color using the coloring tools 105 provided in the picture puzzle kit 100.

In another embodiment, the embedded audio assembly 700 audibly annunciates a resultant color that is obtained when two or more colors are combined, when the puzzle pieces 101 marked with the indicia 102 corresponding to two or more colors are pressed sequentially or simultaneously. As an example, when the user presses a puzzle piece 101 marked with an indicia 102 B corresponding to the color blue and then presses a puzzle piece 101 marked with an indicia 102 Y corresponding to the color yellow, a message "green" is announced.

In another embodiment, the embedded audio assembly 700 audibly annunciates a mismatch when linking of the puzzle pieces 101 is incorrect. Each edge 101a of each of the puzzle pieces 101 comprises a sensor 705 for detecting a mismatch when the linking of the puzzle pieces 101 is incorrect. On detecting the mismatch, the sensor 705 sends a mismatch signal to the embedded audio assembly 700 in the puzzle pieces 101 for generating the audible mismatch message. For example, if a user places a leaf shaped puzzle piece 101 instead of a petal shaped puzzle piece 101 to create a picture of a flower, the embedded audio assembly 700 annunciates a message, for example, "Mismatch" or "Error". Similarly, if the edges 101a of the jigsaw puzzle pieces 601 as exemplarily illustrated in FIG. 6A, do not mate with each other in a correct sequence to complete a picture, a message, for example, "Mismatch" is announced. When all the individual puzzle pieces 101 mate with each other in the correct sequence, a message, for example, "Match" is announced.

In another embodiment, each of the puzzle pieces 101 are marked with two indicia 102, for example, B and Y corresponding to the color blue and the color yellow respectively. Furthermore, multiple removable translucent layers of different colors stacked one above the other are provided in the color chart 104. When, for example, blue and yellow colored translucent layers from the color chart 104 are placed above each other on the puzzle pieces 101, the resultant color, which is green, appears on the puzzle piece 101 when illuminated from the light source 706 embedded in the puzzle piece 101.

Figure 3:
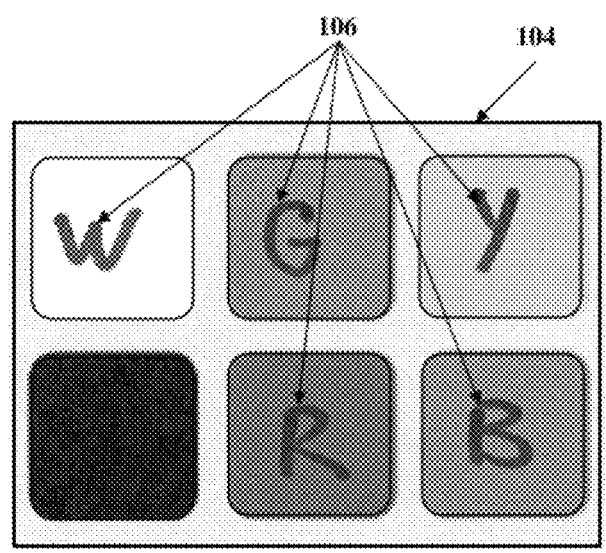
FIG. 3 exemplarily illustrates a color chart for the flower pot picture puzzle, displaying different colors corresponding to the indicia marked on the puzzle pieces of the flower pot picture puzzle.

FIG. 3 exemplarily illustrates a color chart 104 for the flower pot picture puzzle 103 illustrated in FIG. 2B, displaying colors that correspond to the indicia 102 marked on the puzzle pieces 101 of the flower pot picture puzzle 103. The color chart 104 shows the colors with corresponding indicia 106 by superimposing the indicia 106 color symbol, against a background of the colors. For example, indicia 106 of G would be superimposed against a green background in the color chart 104. The color chart 104 for the picture puzzle 103 of FIG. 2B displays indicia 106, for example, W, G, Y, R, and B against background colors white, green, yellow, red, and blue respectively. The color chart 104 is different for each picture puzzle kit 100. In an embodiment, the color chart 104 comprises an embedded audio assembly 700 as exemplarily illustrated in FIG. 7 for audibly indicating colors and indicia 106 in the color chart 104 when pressure is applied on predefined areas of the color chart 104. For example, on pressing the indicia 106 B or a blue colored area in the color chart 104, the embedded audio assembly 700 annunciates the word "blue". In another example, when the user presses the indicia 106 G or a green colored area in the color chart 104, the embedded audio assembly 700 annunciates the message "G for green". The user therefore infers that the indicia 106 G corresponds to the color green and may then color the puzzle piece 101 marked with the indicia 102 G with a green color using the coloring tools 105 provided in the picture puzzle kit 100.

Figure 4A:
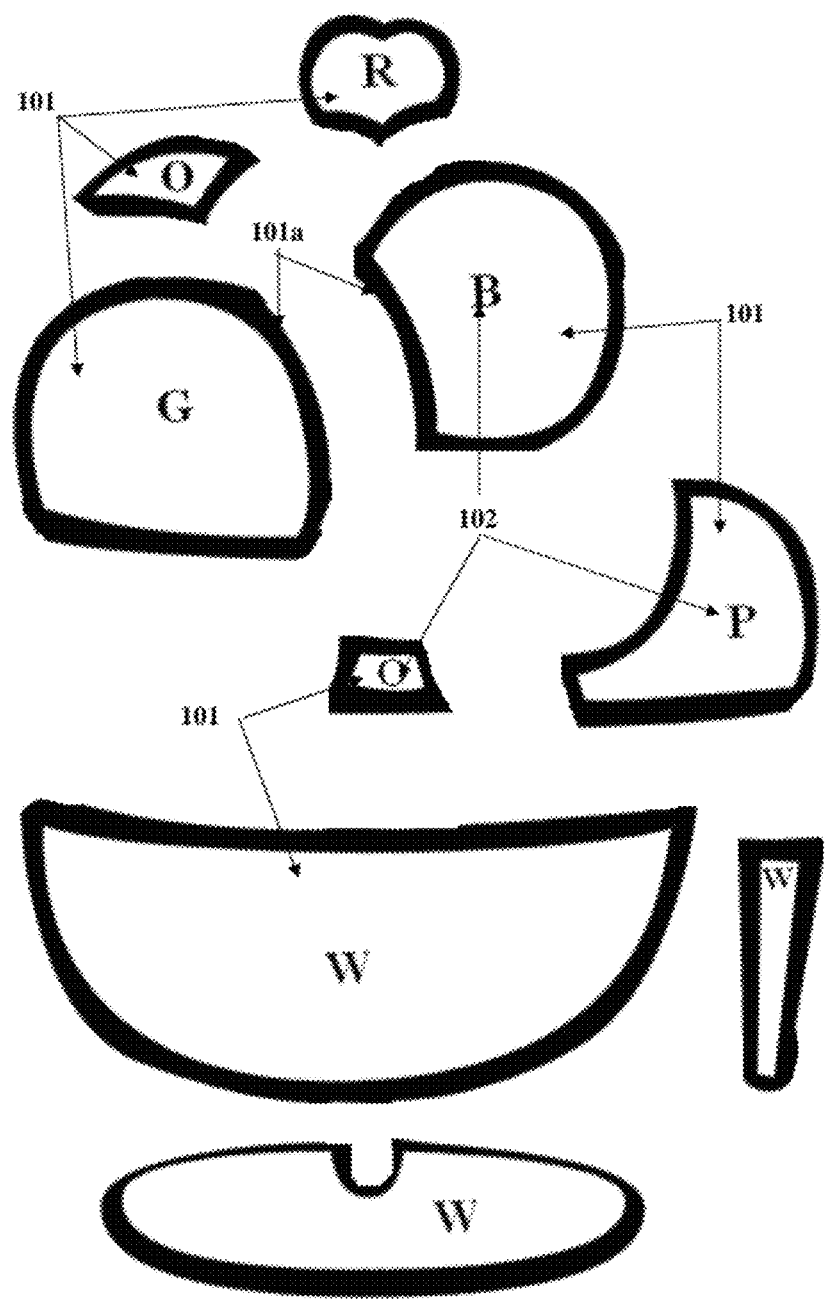
FIG. 4A exemplarily illustrates puzzle pieces comprising parts of a picture of an ice cream sundae.
Figure 4B:
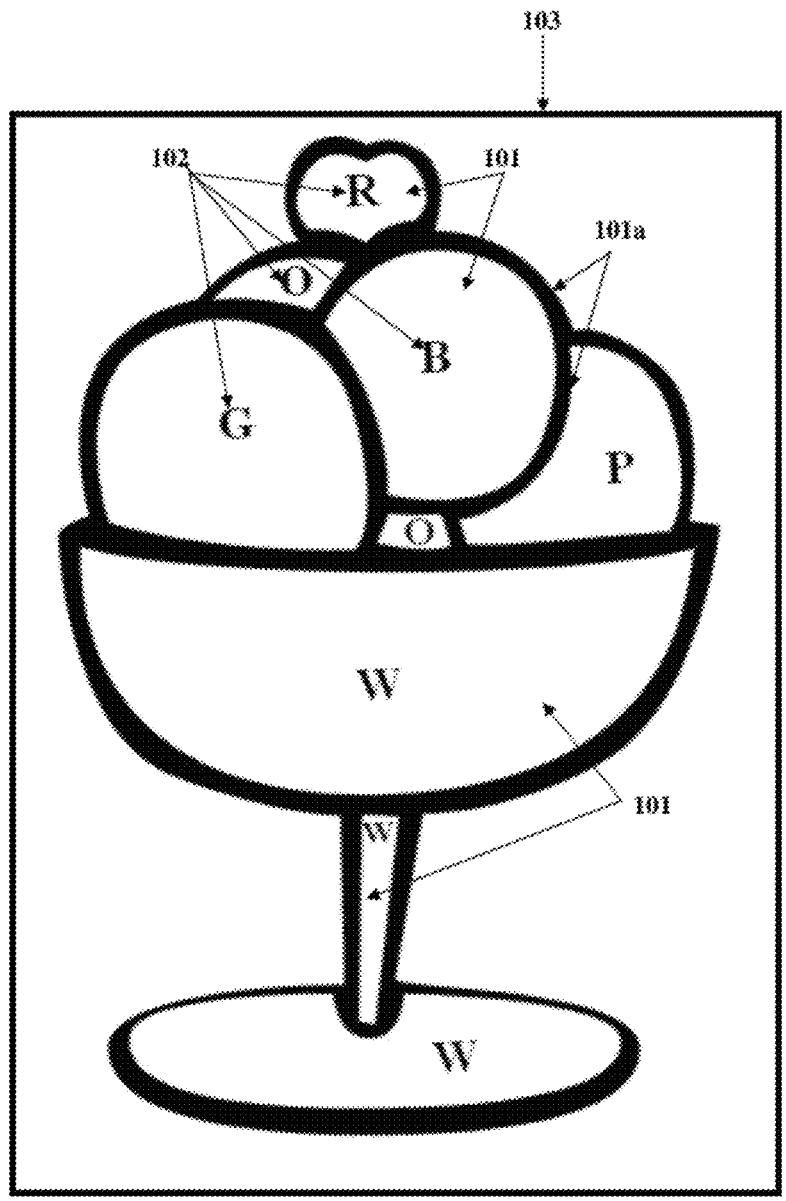
FIG. 4B exemplarily illustrates puzzle pieces marked with indicia representing different colors, placed adjacent to one another to assemble the ice cream sundae picture puzzle.
Figure 5A:
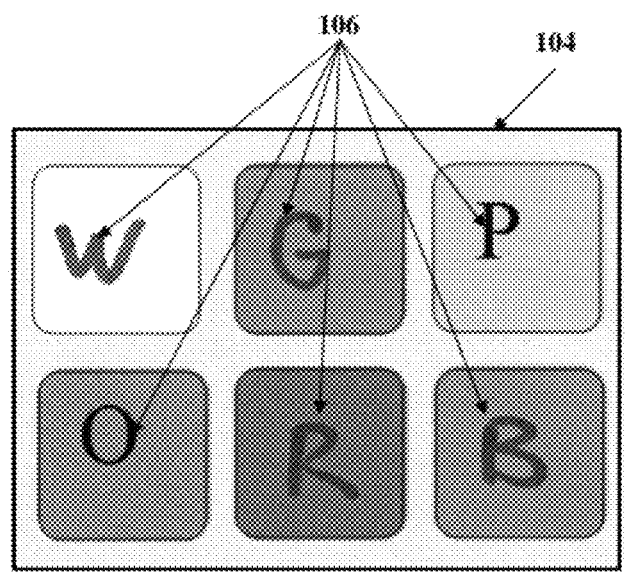
FIGS. 5A-5C exemplarily illustrate color charts for the ice cream sundae picture puzzle, displaying different colors corresponding to the indicia marked on the puzzle pieces of the ice cream sundae picture puzzle.

FIG. 4A exemplarily illustrates puzzle pieces 101 comprising parts of a picture of an ice cream sundae. The puzzle pieces 101 are marked with the indicia 102 W, G, P, O, R, and B corresponding to the colors white, green, pink, orange, red, and blue respectively. The puzzle pieces 101 marked with the indicia 102 W, G, P, O, R, and B representing different colors, are placed adjacent to one another to assemble the ice cream sundae picture puzzle 103 as exemplarily illustrated in FIG. 4B. One of the color charts 104 for the picture puzzle 103 of FIG. 4B comprises the indicia 102 W, G, P, O, R and B against a background of the colors white, green, pink, orange, red, and blue respectively as exemplarily illustrated in FIG. 5A. The user, for example, a child will then color the puzzle pieces 101 with colors based on the background colors displayed on the color chart 104.

In an embodiment, the color chart 104 comprises a first indicia 501a corresponding to a first color, a non-indicative indicia 501b or 501d marked on a peelable layer 501f on the color chart 104, a hidden second indicia 501g or 501h corresponding to a second color positioned below the peelable layer 501f, and a third indicia 501c or 501e corresponding to a resultant third color that will be obtained by mixing the first color and the second color represented by the first indicia 501a and the hidden second indicia 501g or 501h respectively as exemplarily illustrated in FIGS. 5B-5C. The peelable layer 501f marked with the non-indicative indicia 501b or 501d is adjacent to and in removable contact with the hidden second indicia 501g or 501h. The peelable layer 501f is not marked with a color and is opaque and therefore the hidden second indicia 501g or 501h positioned below the peelable layer 501f marked with the non-indicative indicia 501b or 501d is not visible to the user as exemplarily illustrated in FIG. 5B. The user is required to determine the second color represented by the hidden second indicia 501g or 501h, that needs to be mixed with the first color represented by the first indicia 501a on the color chart 104, to obtain the resultant third color represented by the third indicia 501c or 501e on the color chart 104, since there is no color marked on the non-indicative indicia 501b or 501d. If the user does not know the color represented by the non-indicative indicia 501b or 501d, the user can try to find the color represented by the non-indicative indicia 501b or 501d by trial and error, by mixing different colors with the first color represented by the first indicia 501a using the coloring tools 105 from the picture puzzle kit 100. If the user fails to determine the second color, the user can remove the peelable layer 501f marked with the non-indicative indicia 501b or 501d to reveal the hidden second indicia 501g or 501h corresponding to the second color to be mixed with the first color for obtaining the resultant third color. FIG. 5C exemplarily illustrates the peelable layer 501f marked with the non-indicative indicia 501b or 501d that when peeled, reveals the hidden second indicia 501g or 501h. The user may then mix the first color represented by the first indicia 501a with the second color represented by the hidden second indicia 501g or 501h using the coloring tools 105 from the picture puzzle kit 100 to produce the resultant third color represented by the third indicia 501c or 501e. The user can then color a puzzle piece 101 marked with indicia 102 corresponding to the third indicia 501c or 501e with the produced third color.

Figure 5B:
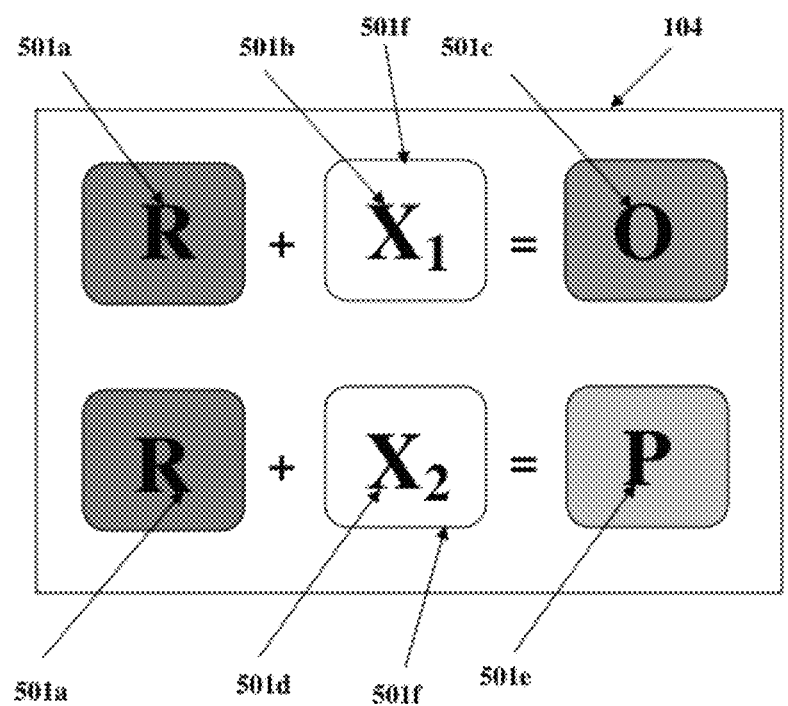
Figure 5C:
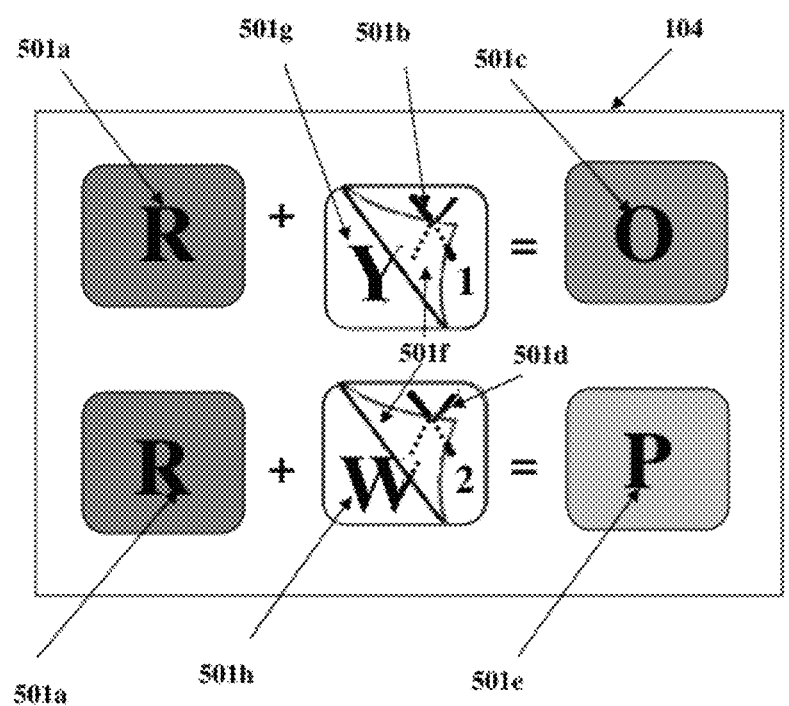

Consider an example of a color chart 104 as exemplarily illustrated in FIGS. 5B-5C. The color chart 104 comprises a first indicia 501a marked "R" corresponding to the color red, a non-indicative indicia 501b marked "$X_1$" on a peelable layer 501f on the color chart 104, a hidden second indicia 501g marked "Y" positioned below the peelable layer 501f, and a third indicia 501c marked "O" corresponding to the resultant color orange that will be obtained by mixing colors represented by the first indicia 501a and the hidden second indicia 501g. The peelable layer 501f marked with the non-indicative indicia 501b "$X_1$" is in removable contact with the hidden second indicia 501g. The peelable layer 501f is not marked with a color and is opaque and therefore the hidden second indicia 501g positioned below the peelable layer 501f marked with the non-indicative indicia 501b "$X_1$", is not visible to the user as exemplarily illustrated in FIG. 5B. The user is required to determine the second color represented by the hidden second indicia 501g, that needs to be mixed with the color red represented by the first indicia 501a "R" on the color chart 104 to obtain the resultant color orange represented by the third indicia 501c "O" on the color chart 104, since there is no color marked on the non-indicative indicia 501b marked "$X_1$". If the user does not know the color represented by the non-indicative indicia 501b marked "$X_1$", the user can try to find the color represented by the non-indicative indicia 501b marked "$X_1$" by trial and error, by mixing different colors with the color red represented by the first indicia 501a "R" using the coloring tools 105 from the picture puzzle kit 100. The user can continue mixing different colors with the color red till the user finds that by mixing the color red with the color yellow not shown on the color chart 104 and marked by 501b "$X_1$", the resultant color produced is orange. The user can then use the produced orange color to color a puzzle piece 101 marked with indicia 102 "O". If the user cannot find the correct color to add to the color red to produce the color orange, the user can peel off the peelable layer 501f marked with non-indicative indicia 501b "$X_1$" to reveal the hidden second indicia 501g marked "Y" below the peelable layer 501f as exemplarily illustrated in FIG. 5C. The hidden second indicia 501g marked "Y" corresponds to the color yellow on the color chart 104. The user can then mix the color red represented by the first indicia 501a "R" and the color yellow represented by the hidden second indicia 501g "Y" using the coloring tools 105 to produce the color orange represented by the third indicia 501c "O" which the user can then use to color a puzzle piece 101 marked with indicia 102 "O".

Similarly, in another example, the color chart 104 illustrated in FIGS. 5B-5C comprises a first indicia 501a marked "R" corresponding to the color red, a non-indicative indicia 501d marked "$X_2$" on a peelable layer 501f on the color chart 104, a hidden second indicia 501h marked "W" positioned below the peelable layer 501f, and a third indicia 501e marked "P" corresponding to the resultant color pink that will be obtained by mixing colors represented by the first indicia 501a and the hidden second indicia 501h. The peelable layer 501f marked with the non-indicative indicia 501d "$X_2$" is in removable contact with the hidden second indicia 501h. The peelable layer 501f is not marked with a color and is opaque and therefore the hidden second indicia 501h positioned below the peelable layer 501f marked with the non-indicative indicia 501d "$X_2$", is not visible to the user as exemplarily illustrated in FIG. 5B. The user is required to determine the second color represented by the hidden second indicia 501h, that needs to be mixed with the color red represented by the first indicia 501a "R" on the color chart 104 to obtain the resultant color pink represented by the third indicia 501e "P" on the color chart 104, since there is no color marked on the non-indicative indicia 501d marked "$X_2$". If the user does not know the color represented by the non-indicative indicia 501d marked "X₂", the user can try to find the color represented by the non-indicative indicia 501d marked "X₂" by trial and error, by mixing different colors from the picture puzzle kit 100 with the color red represented by the first indicia 501a "R" using the coloring tools 105 from the picture puzzle kit 100. The user can continue mixing different colors with the color red till the user finds that by mixing the color red with the color white not shown on the color chart 104 and marked by 501d "X₂", the resultant color produced is pink. The user can then use the produced pink color to color a puzzle piece 101 marked with indicia 102 "P". If the user cannot find the correct color to add to the color red to produce the color pink, the user can peel off the peelable layer 501f marked with non-indicative indicia 501d "X₂" to reveal the hidden second indicia 501h marked "W" below the peelable layer 501f as exemplarily illustrated in FIG. 5C. The hidden second indicia 501h marked "W" corresponds to the color white on the color chart 104. The user can then mix the color red represented by the first indicia 501a "R" and the color white represented by the hidden second indicia 501h "W" using the coloring tools 105 to produce the color pink represented by the third indicia 501e "P" which the user can then use to color a puzzle piece 101 marked with indicia 102 "P".

In another embodiment, the embedded audio assembly 700 in the puzzle pieces 101 or the color chart 104 audibly indicates multiple colors and a resultant color obtained by mixing the colors. For example, when a user presses a puzzle piece 101 marked with an indicia 102 "O" as exemplarily illustrated in FIG. 4A or presses an indicia 501c "O" on the color chart 104 as exemplarily illustrated in FIG. 5B, the speaker 701 of the embedded audio assembly 700 in the puzzle piece 101 or the color chart 104, audibly annunciates a message "Red and yellow produces orange". The user may then use the coloring tools 105 that are mixable, for example, paints, inks, dyes, or pigments to mix the color red with the color yellow to produce the color orange to color a puzzle piece 101 marked with indicia 102 "O".

Similarly, when a user presses a puzzle piece 101 marked with an indicia 102 "P" as exemplarily illustrated in FIG. 4A or presses an indicia 501e "P" on the color chart 104 as exemplarily illustrated in FIG. 5B, the speaker 701 of the embedded audio assembly 700 in the puzzle piece 101 or the color chart 104, audibly annunciates a message "Red and white produces pink". The user can then use the coloring tools 105 that are mixable, for example, paints, inks, dyes, or pigments to mix the color red with the color white to produce the color pink to color a puzzle piece 101 marked with indicia 102 "P".

The user may color the picture that has been assembled, in colors corresponding to the different colors displayed on the color chart 104 using the coloring tools 105 provided in the picture puzzle kit 100. Each of the coloring tools 105 corresponds to one of the colors. The coloring tools 105 comprise, for example, crayons, inks, markers, dyes, pigments, or paints for example, acrylic paints, oil paints, water colors, finger paints, etc. The picture puzzle kit 100 further comprises brushes for painting the picture puzzle 103. The base used to support the puzzle pieces 101 may also be painted using the coloring tools 105. The user may color the picture before linking the puzzle pieces 101 or after linking the puzzle pieces 101 to assemble the picture puzzle 103. The picture puzzle kit 100 may be used to entertain a user and the puzzle pieces 101 may also be used as a play thing and display item.

Figure 6A:
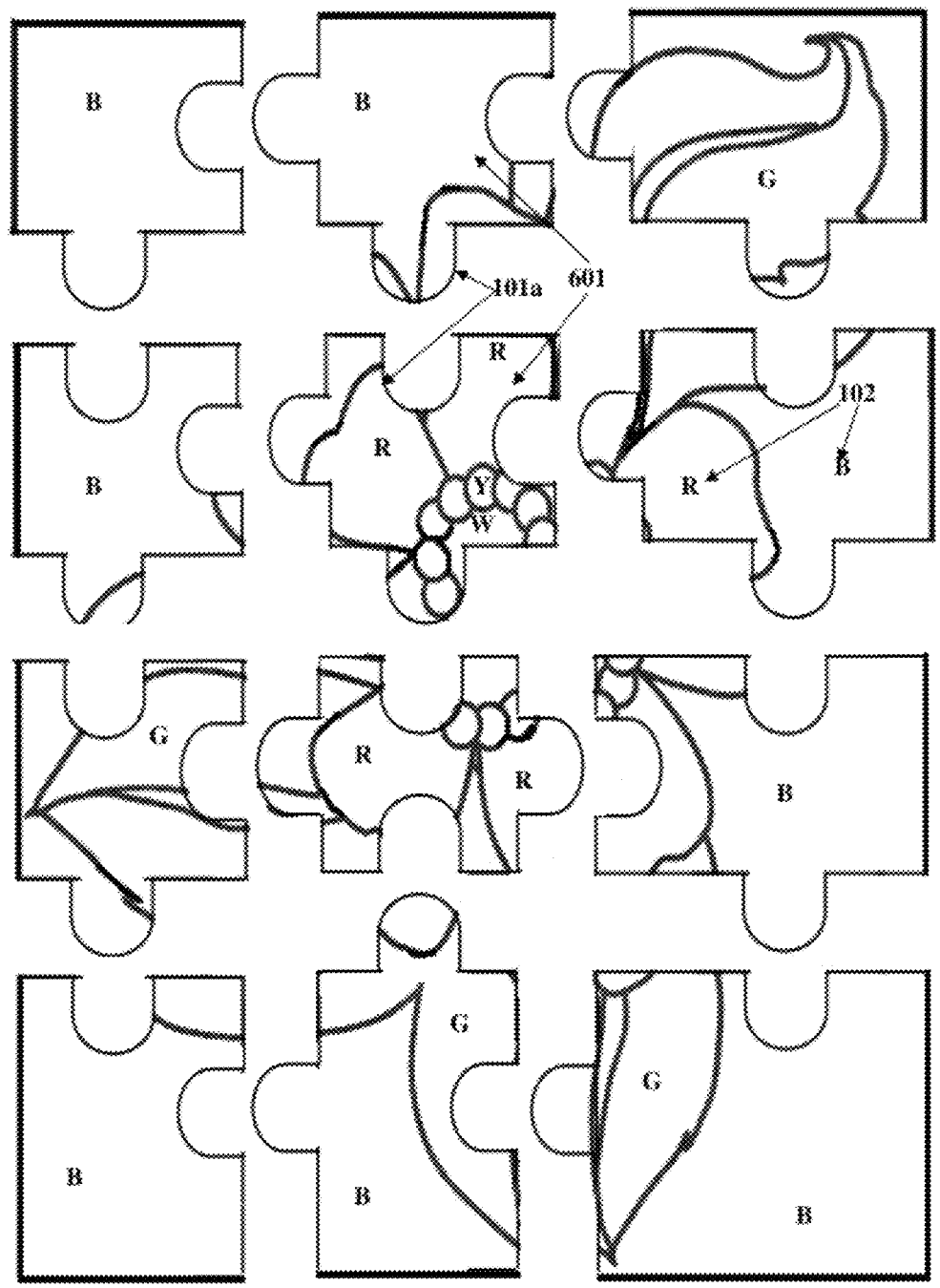
FIG. 6A exemplarily illustrates jigsaw puzzle pieces comprising parts of a picture of a flower.
Figure 6B:
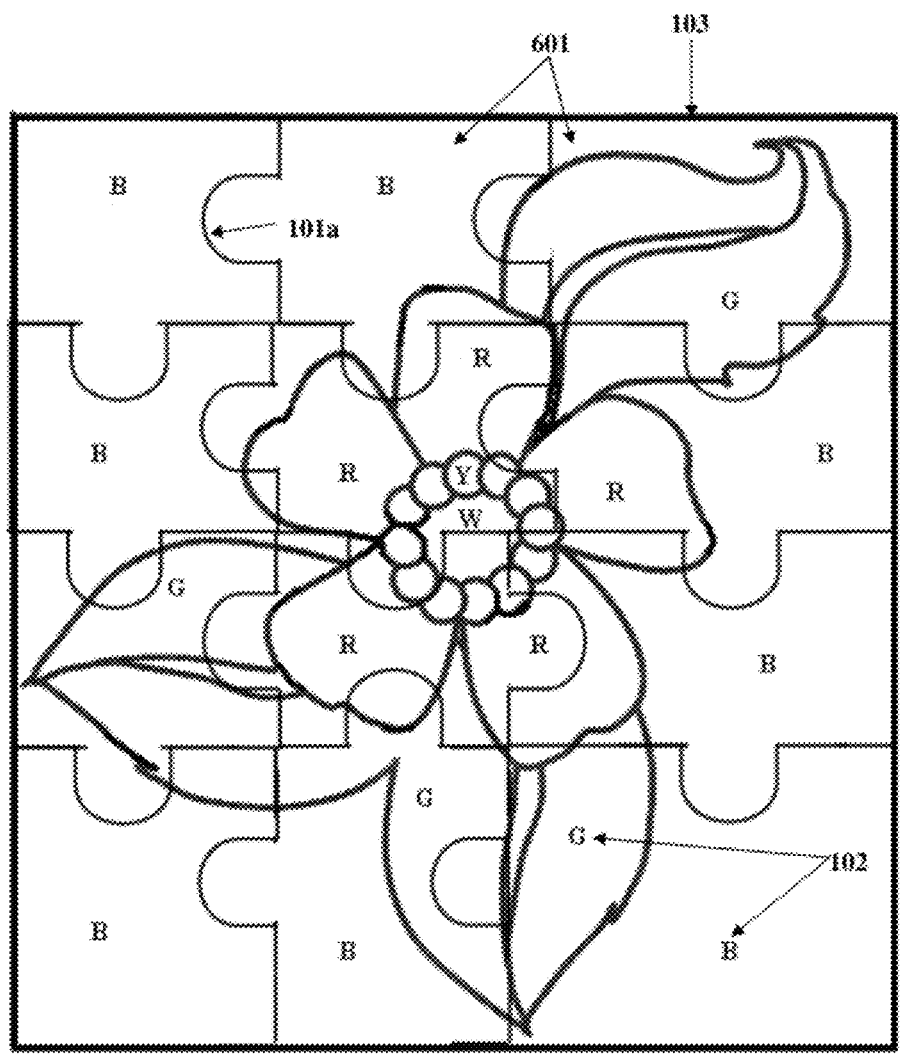
FIG. 6B exemplarily illustrates jigsaw puzzle pieces marked with indicia representing different colors, interlocked to assemble the flower picture puzzle.

FIG. 6A exemplarily illustrates jigsaw puzzle pieces 601 comprising parts of a picture of a flower. The jigsaw puzzle pieces 601 are marked with the indicia 102 W, G, Y, R, and B representing the colors white, green, yellow, red, and blue respectively. The flower picture puzzle 103 is assembled by interlocking the jigsaw puzzle pieces 601 as exemplarily illustrated in FIG. 6B. The jigsaw puzzle pieces 601 are of different shapes and sizes. The indicia 102 marked on the jigsaw puzzle pieces 601 enable the user to color the jigsaw puzzle pieces 601 using the color chart 104 and the coloring tools 105. The color chart 104 for the picture puzzle 103 of FIG. 6B is exemplarily illustrated in FIG. 3. The user uses the coloring tools 105 to apply the actual color on the jigsaw puzzle pieces 601. The base may also be used for supporting the jigsaw puzzle pieces 601.

Figure 8:
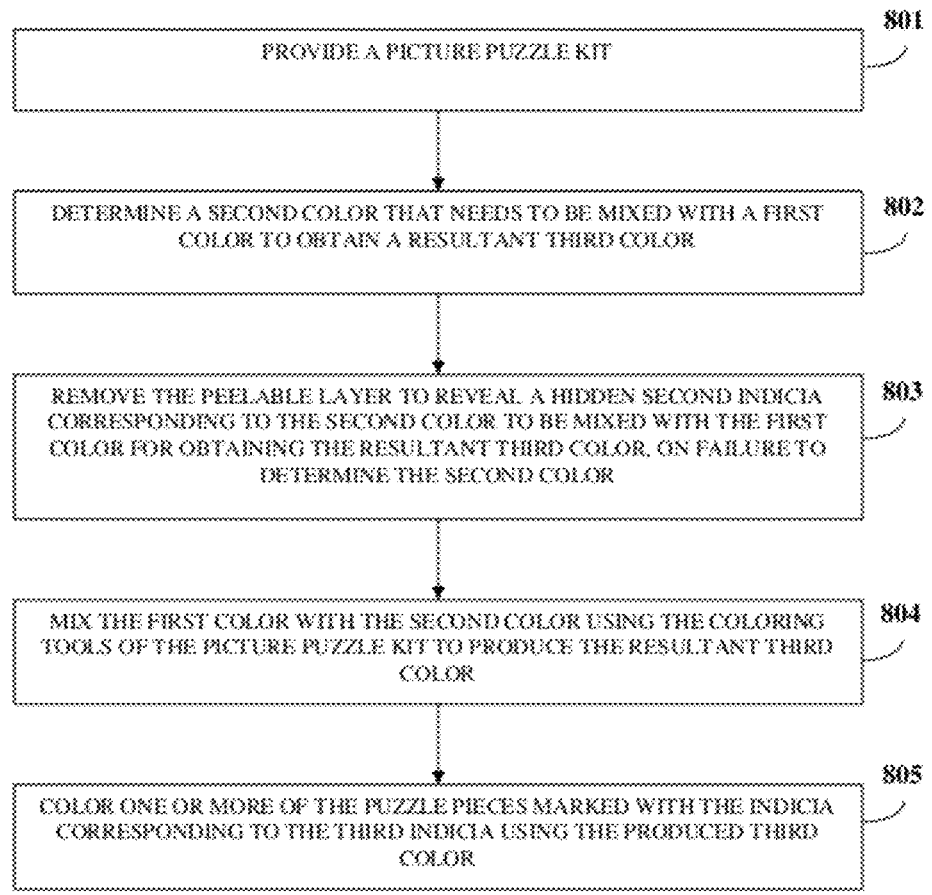
FIG. 8 exemplarily illustrates a method of coloring puzzle pieces of a picture puzzle using indicia marked on the puzzle pieces.

FIG. 8 exemplarily illustrates a method of coloring puzzle pieces 101 of a picture puzzle 103 using indicia 102 marked on the puzzle pieces 101. A picture puzzle kit 100 as explained in the detailed description of FIG. 1 is provided 801. The picture puzzle kit 100 comprises a color chart 104 comprising a first indicia 501a, a non-indicative indicia 501b or 501d, a hidden second indicia 501g or 501h, and a third indicia 501c or 501e as explained in the detailed description of FIGS. 5B-5C. The first indicia 501a corresponding to a first color. The non-indicative indicia 501b or 501d is marked on an opaque peelable layer 501f on the color chart 104. The peelable layer 501f marked with the non-indicative indicia 501b or 501d is adjacent to and in removable contact with the hidden second indicia 501g or 501h. The hidden second indicia 501g or 501h corresponds to a second color and is positioned immediately below the peelable layer 501f. The hidden second indicia 501g or 501h corresponding to the second color is revealed on removing the peelable layer 501f marked with the non-indicative indicia 501b or 501d as exemplarily illustrated in FIG. 5C. The third indicia 501c or 501e corresponds to a resultant third color that will be obtained by mixing the first color and the second color represented by the first indicia 501a and the hidden second indicia 501g or 501h respectively. The picture puzzle kit 100 further comprises coloring tools 105 comprising multiple mixable colors for coloring the puzzle pieces 101 using the mixable colors.

The user determines 802 the second color represented by the hidden second indicia 501g or 501h on the color chart 104, that needs to be mixed with the first color represented by the first indicia 501a on the color chart 104 to obtain the resultant third color represented by the third indicia 501c or 501e on the color chart 104, by mixing multiple colors with the first color using the coloring tools 105 from the picture puzzle kit 100. If the user does not know the color represented by the non-indicative indicia 501b or 501d, the user can try to find the color represented by the non-indicative indicia 501b or 501d by trial and error, by mixing different colors from the picture puzzle kit 100 with the first color represented by the first indicia 501a using the coloring tools 105. If the user fails to determine the second color, the user can remove 803 the peelable layer 501f marked with the non-indicative indicia 501b or 501d to reveal the hidden second indicia 501g or 501h corresponding to the second color to be mixed with the first color for obtaining the resultant third color. The user then mixes 804 the first color represented by the first indicia 501a with the second color represented by the hidden second indicia 501g or 501h using the coloring tools 105 from the picture puzzle kit 100 to produce the resultant third color represented by the third indicia 501c or 501e. The user then colors 805 one or more of the puzzle pieces 101 marked with the indicia 102 corresponding to the third indicia 501c or 501e using the produced third color.

The foregoing examples have been provided merely for the purpose of explanation and are in no way to be construed as limiting of the invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A picture puzzle kit for coloring a picture puzzle marked with indicia corresponding to a plurality of colors, comprising:
   a plurality of puzzle pieces comprising parts of a picture, wherein said picture puzzle is assembled by linking said puzzle pieces, wherein said puzzle pieces are marked with said indicia corresponding to said colors;
   an audio assembly embedded in each of said puzzle pieces for audibly indicating color of each of said puzzle pieces, wherein said embedded audio assembly audibly indicates a resultant color produced by combining two or more colors when said puzzle pieces marked with said indicia, corresponding to said two or more colors, are pressed sequentially; and
   a plurality of coloring tools for coloring said puzzle pieces; whereby said picture puzzle kit enables a user to color said picture puzzle using said indicia marked on said puzzle pieces.

2. The picture puzzle kit of claim 1, wherein said linking is performed by placing said puzzle pieces adjacent to one another.

3. The picture puzzle kit of claim 1, wherein said puzzle pieces are shaped as jigsaw puzzle pieces for interlocking adjacent puzzle pieces.

4. The picture puzzle kit of claim 1, further comprising a color chart for displaying a plurality of colors corresponding to said indicia marked on said puzzle pieces.

5. The picture puzzle kit of claim 4, wherein said color chart displays said colors with corresponding indicia by superimposing said corresponding indicia against a background of said colors.

6. The picture puzzle kit of claim 4, wherein said color chart comprises:
   a first indicia corresponding to a first color;
   a non-indicative indicia marked on a peelable layer on said color chart;
   said peelable layer adjacent to and in removable contact with a hidden second indicia;
   said hidden second indicia corresponding to a second color, wherein said hidden second indicia is positioned below said peelable layer, wherein said hidden second indicia corresponding to said second color is revealed on removing said peelable layer marked with said non-indicative indicia; and
   a third indicia corresponding to a resultant third color that will be produced by mixing said first color and said second color represented by said first indicia and said hidden second indicia respectively.

7. The picture puzzle kit of claim 1, further comprising a plurality of removable layers stacked one above the other on each of said puzzle pieces, wherein one of said removable layers is removed for revealing another one of said removable layers below said one of said removed layers, wherein each of said removable layers is transparent and is marked with one of said indicia corresponding to one of said colors.

8. The picture puzzle kit of claim 7, wherein said coloring tools provide translucent colors for coloring on said transparent removable layers, wherein said colored layers, when combined, form new colors.

9. The picture puzzle kit of claim 8, further comprising a light source embedded in each of said puzzle pieces to illuminate said colored layers stacked on said each of said puzzle pieces.

10. The picture puzzle kit of claim 1, further comprising a rub off removable layer provided on each of said puzzle pieces, wherein said rub off removable layer reveals one of said indicia corresponding to one of said colors.

11. The picture puzzle kit of claim 1, wherein said embedded audio assembly audibly indicates one or more of a plurality of characteristics of each of said puzzle pieces when said each of said puzzle pieces is pressed one or more times.

12. The picture puzzle kit of claim 1, wherein each edge of each of said puzzle pieces comprises a sensor for detecting a mismatch when said linking of said puzzle pieces is incorrect, whereby a mismatch signal is sent to said embedded audio assembly for audibly indicating said mismatch.

13. The picture puzzle kit of claim 4, wherein said color chart comprises an embedded audio assembly for audibly indicating said colors and said indicia in said color chart.

14. A picture puzzle kit comprising:
   a plurality of puzzle pieces, each of said puzzle pieces having a length, a width, and a thickness, said thickness being small compared to said length and said width, each of said puzzle pieces defining an outside edge, said outside edge of each of said puzzle pieces being configured to mate with outside edges of at least two other of said puzzle pieces, and said puzzle pieces marked with indicia corresponding to a plurality of colors;
   an audio assembly embedded in each of said puzzle pieces, wherein said audio assembly audibly indicates a plurality of characteristics of one of said puzzle pieces when said puzzle piece is pressed one or more times, and wherein said embedded audio assembly audibly indicates a plurality of colors and a resultant color produced by mixing said colors;
   one or more color charts comprising said indicia, said one or more color charts displaying a plurality of colors corresponding to said indicia;
   a plurality of coloring tools, each of said coloring tools corresponding to one of said colors; and
   said puzzle pieces together defining a picture when said outside edge of each of said puzzle pieces are mated one to another and each one of said puzzle pieces is colored using one of said coloring tools corresponding to said one of said colors associated by said one or more color charts with said indicia marked on each of said puzzle pieces.

15. The picture puzzle kit of claim 14, further comprising a plurality of removable layers stacked one above the other on each of said puzzle pieces, wherein one of said removable layers is removed for revealing another one of said removable layers below said one of said removed layers, wherein each of said removable layers is transparent and is marked with one of said indicia corresponding to one of said colors.

16. The picture puzzle kit of claim 14, wherein said one or more color charts comprises an embedded audio assembly for audibly indicating said colors and said indicia in said one or more color charts, wherein said embedded audio assembly audibly indicates a said colors and a resultant color obtained produced by mixing said colors.

* * * * *